United States Statutory Invention Registration [19]

[11] Reg. Number: H308

Tutin et al.

[43] Published: Jul. 7, 1987

[54] FABRIC VISUAL/INFRARED/RADAR DECOYS

[75] Inventors: Michael B. Tutin, Thurston, United Kingdom; Steven A. Pitman, Beavercreek; Gregory R. Bothe, West Carrollton, both of Ohio

[73] Assignee: The United States of America as represented by the Secretary of the Air Force, Washington, D.C.

[21] Appl. No.: 856,567

[22] Filed: Apr. 28, 1986

[51] Int. Cl.[4] ..... G01S 13/00

[52] U.S. Cl. ..... 342/4; 342/10

[58] Field of Search ..... 342/1-13; 244/1 TD, 119, 3 R

[56] References Cited

U.S. PATENT DOCUMENTS

| | | | |
|---|---|---|---|
| 2,576,255 | 11/1951 | Hudspeth et al. | 342/8 |
| 3,010,103 | 11/1961 | Hoppes et al. | 244/3 |
| 3,010,104 | 11/1961 | Powell | 244/3 |
| 3,135,511 | 6/1964 | Norman et al. | 244/3 |
| 3,295,793 | 1/1967 | Renart | 244/3 |
| 3,311,376 | 3/1967 | Woodward et al. | 244/3 |
| 4,014,481 | 3/1977 | Daikeler et al. | 244/3 |
| 4,354,419 | 10/1982 | Patterson | 244/1 |

*Primary Examiner*—Stephen C. Buczinski

*Assistant Examiner*—Linda J. Wallace

*Attorney, Agent, or Firm*—Fredric L. Sinder; Donald J. Singer

[57] ABSTRACT

An aircraft decoy is made by assembling metal or plastic pipe or tubing into tubing fittings to form the shape of an actual aircraft. The tubing is marked with location identification markings. The decoy thus constructed is easily disassembled, stored, transported, or reassembled. The aircraft decoy is covered with an open weave fabric to minimize air resistance so that high winds will not move the decoy on the ground. The fabric is coated with paint to mimic not only the optical characteristics or signature of the actual aircraft, but also the infrared and radar signature of the actual aircraft. Metal particles can be added to paint to increase the infrared and radar signatures.

12 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FABRIC VISUAL/INFRARED/RADAR DECOYS

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of aircraft decoys, and more specifically to realistic decoy coverings and easily assembled disassembled and transportable decoy frames.

Aircraft decoys simulate full size aircraft to mislead enemy reconnaissance. Full size aircraft decoys have been disclosed in U.S. Pat. No. 2,334,539 to Buchtel, U.S. Pat. No. 2,351,891 to Weisbaum, U.K. Specification No. 767,257 to Wyllie, and others. Those, and other patents, have also disclosed various frames to allow for convenient assembly, disassembly and transport before reassembly elsewhere. The prior art also teaches as in Buchtel and Wyllie, and in U.S. Pat. No. 2,395,914 to Scott, painting the decoy coverings to visually resemble actual aircraft and markings. Other than the use of ordinary paint to mimic the visual aspects of real aircraft, the prior art teaches nothing concerning simulating the radar or infrared signatures of actual aircraft.

The use of special coverings to conceal objects from radar has been disclosed in previous patents. U.S. Pat. No. 3,187,331 to Beller and U.S. Pat. No. 3,349,397 to Rosenthal disclosed a radar absorbing covering. And, U.S. Pat. No. 3,396,400 to Kelly, et al. discloses a radar transparent covering. The use of special coverings to make an object more visible to radar has also been disclosed. U.S. Pat. No. 4,420,757 to Ebneth, for example, discloses a metallized sheet form textile for making small objects at sea, such as small boats, more visible to radar to facilitate rescue attempts in high seas.

To deceive modern aerial reconnaissance requires more than the visual factors shown in the prior art decoy patents, and more than the use of an enhanced radar reflecting fabric such as described by Ebneth. Objects which are the subject of aerial reconnaissance produce distinctive visual, radar and infrared signatures, all three of which must be simulated in order to create an effective decoy. Previous aircraft decoys have attempted to simulate only the visual characteristics of actual aircraft, and have not taught the need to simulate all three characteristic signatures in order to create a decoy convincing to modern aerial reconnaissance.

Another common problem with prior art aircraft decoys is their light weight which, while making them convenient to set up, also makes them susceptible to being moved or damaged by storms and high winds.

With the foregoing in mind, it is, therefore, a principal object of the present invention to provide an improved aircraft decoy that is capable of simulating the visual, radar and infrared signatures of actual aircraft.

It is an additional object to provide an improved covering that casts a solid shadow and minimizes the effect of high winds on the aircraft decoy.

It is another object of the present invention to provide a novel aircraft decoy construction method that provides convenient assembly, disassembly and reassembly.

It is a feature of the present invention that the new construction method is particularly adaptable to kit construction and, when disassembled, provides a very lightweight and low volume package for shipping.

These and other objects and features of the present invention will become apparent as the detailed description of a representative embodiment proceeds.

SUMMARY OF THE INVENTION

In accordance with the foregoing principles and objects of the present invention, a novel aircraft decoy is described which includes a covering over its frame to provide desired visual, radar and infrared signatures to aerial reconnaissance. The covering may comprise a fabric and coating.

The invention also includes an open weave fabric to minimize air resistance.

The invention further includes an aircraft decoy frame and a method of assembling aircraft decoy frames by the use of tubing and tubing fittings. The tubing may be marked with location identification markings.

BRIEF DESCRIPTION OF THE DRAWINGS

The present invention will be more clearly understood from a reading of the following detailed description in conjunction with the accompanying drawings.

DETAILED DESCRIPTION OF THE INVENTION

Figure 1:
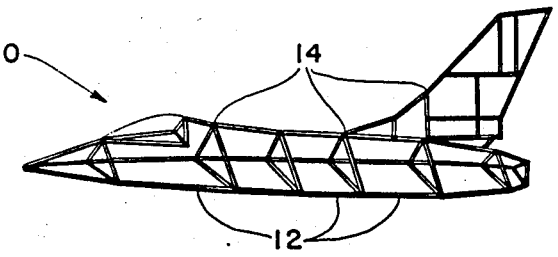
FIG. 1 is a simplified perspective drawing showing the basic frame concept of a decoy aircraft fuselage.

Referring to FIG. 1 of the drawings, there is shown a simplified perspective drawing of the basic frame concept of a frame 10 of a fuselage of an aircraft decoy. The frame comprises a number of metal or plastic pipes or tubing 12 of various lengths, connected by fittings 14 to form the approximate shape of an aircraft fuselage.

As indicated by the drawing sophisticated shapes can be quickly and easily made by this method of using tubing and fittings. The profile from the air of the actual aircraft to be mimicked determines the final configuration. The triangular sections create strength, and additional tubing and fittings can be added to triangulate square sections to add further strength as needed.

Figure 2:
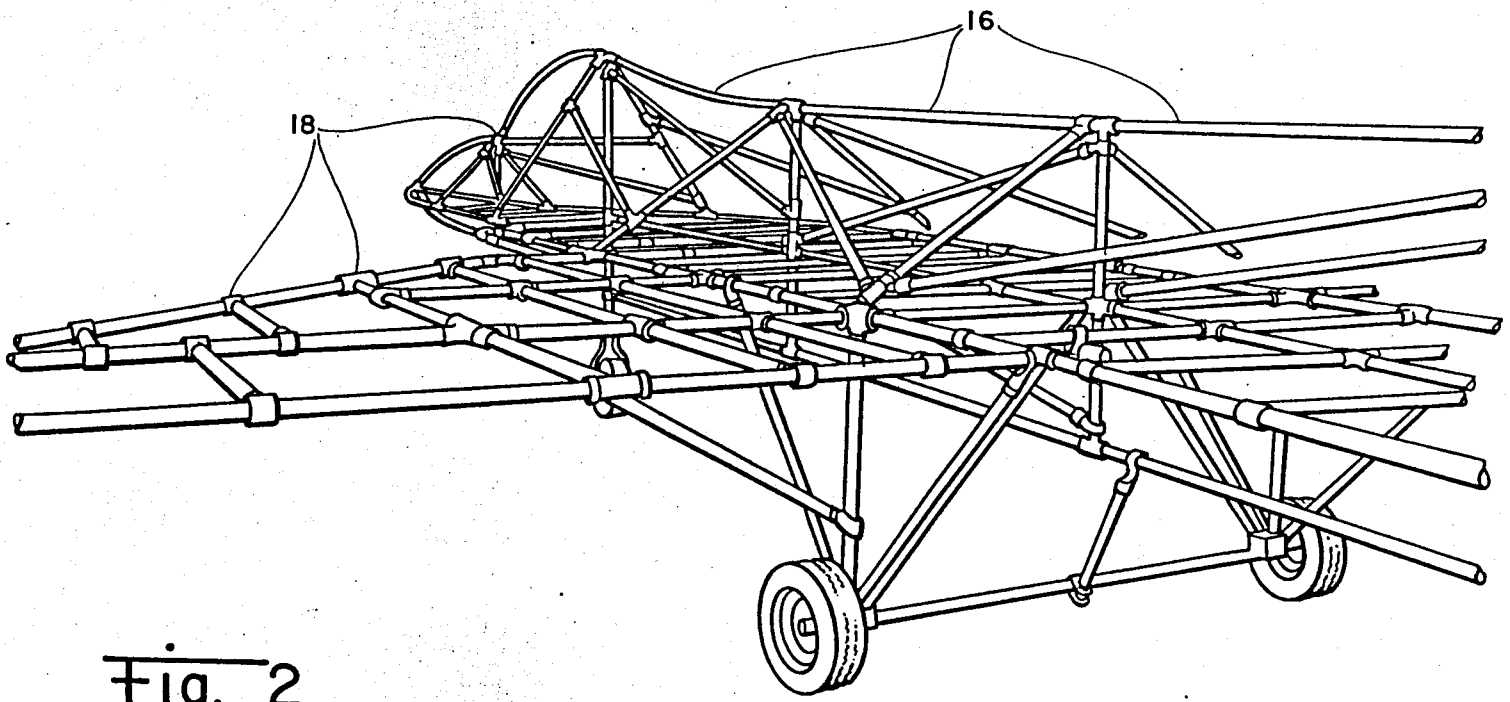
FIG. 2 is a perspective drawing of a portion of a decoy aircraft showing the assembly of tubing connected by fittings, over which various frame coverings may be applied.

FIG. 2 is a perspective drawing of a portion of a decoy aircraft showing a more detailed embodiment of an assembly of tubing 16 and tubing fittings 18 over which various frame coverings may be applied. The fittings shown use set screws to retain tubing sections 16, but other fittings, such as those utilizing male and female threads for use with threaded tubing, may be used as well. Shear and cotter pins may be added to the fittings to increase strength, and weldment used to provide permanence and strength for appropriate sections. In most cases, standard fittings may be used, and special fittings can be easily fabricated where needed.

The use of metal tubing and fittings allows the aircraft decoy to be disassembled in sections, making possible different degrees of disassembly to balance ease of reassembly with varying storage and transport requirements. When fully broken down, the aircraft decoy frame allows extremely compact storage.

This embodiment shows the use of additional tubing and fittings to not only add strength, but also to subdivide existing sections along the centerline of the fuselage to allow the decoy to be bullt in right and left halves. The tubing and connectors are additionally arranged to provide structural strength to support a towing bar attached at the front of the decoy.

Figure 3:
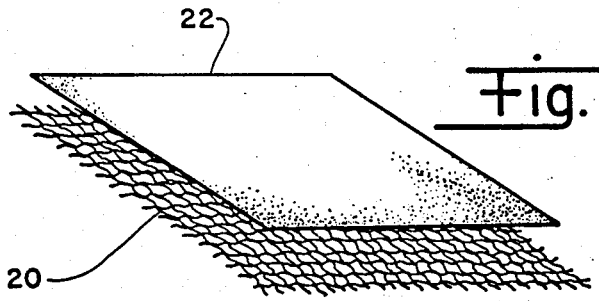
FIG. 3 is a perspective schematic drawing of the frame covering showing a fabric and a coating.

Referring now to FIG. 3, there is shown a schematic representation of a frame covering material comprising a high strength fabric 20 and a coating 22. The covering is stretched and secured over the frame. The fabric is of an relatively open weave to minimize resistance to air passing through the fabric, yet will still display an acceptable shadow. This helps prevent high winds and storms from moving the decoy. A knitted 100% nylon fabric, available from Gehring Textiles, Inc., 200 Madison Avenue, New York, N.Y. 10016, has worked successfully in tests.

Coatings 22 to be used must adhere to the individual threads of the fabric 20, preserving the open weave and must be flexible. Additionally, the coatings should protect the fabric 20 and prevent deterioration. Chemically bonded photo resistive dyes have been successfully used. Such photo resistive dyes, including their application to the fabric at the factory, are also available from Gehring Textiles. A gray dye was used, leaving the native white color of the nylon fabric 20 uncoated for the canopy and exhaust port areas. A tar base type spray paint for automobile use, such as undercoating or trunk spatter paint, was used for shading and enhancing the appearance of the decoy. These types of paints were found to have the best adhering qualities for application to the nylon fabric.

The various coatings to be applied to the fabric are selected to duplicate as closely as possible the actual visual, infrared and radar signatures of the actual aircraft which the decoy is intended to mimic. The visual duplication is simply a straightforward application of paints to match the color and markings of the actual aircraft. The infrared and radar mimicry are both accomplished by adding metal to the decoy. In tests with decoys made with metal tubing, the metal in the tubing was sufficient to create the desired infrared and radar signatures. When plastic tubing is used, or to increase the reflection, a metallized paint may be used. Either a commercial metallized paint may be used, or powdered metal may be mixed with the paint already selected. For maximum effectiveness, silver bearing dust or paint can be used. Pre-metallized fabrics may be used, in some case eliminating the need for a separate coating. The metallized fabric may incorporate metal in various forms, such as flakes, strips, or strands and wire woven as part of the weave. Another alternative is metal screening underneath the fabric covering frame sections, such as wing tips, that contain less metal.

It will be seen by those with skill in the art that the structure of the invention permits a wide variety of additional features. For example, containers of kerosene may be placed within the structure, mimicking the burning of an actual aircraft when attacked by enemy aircraft deceived by the decoy.

Figure 4:
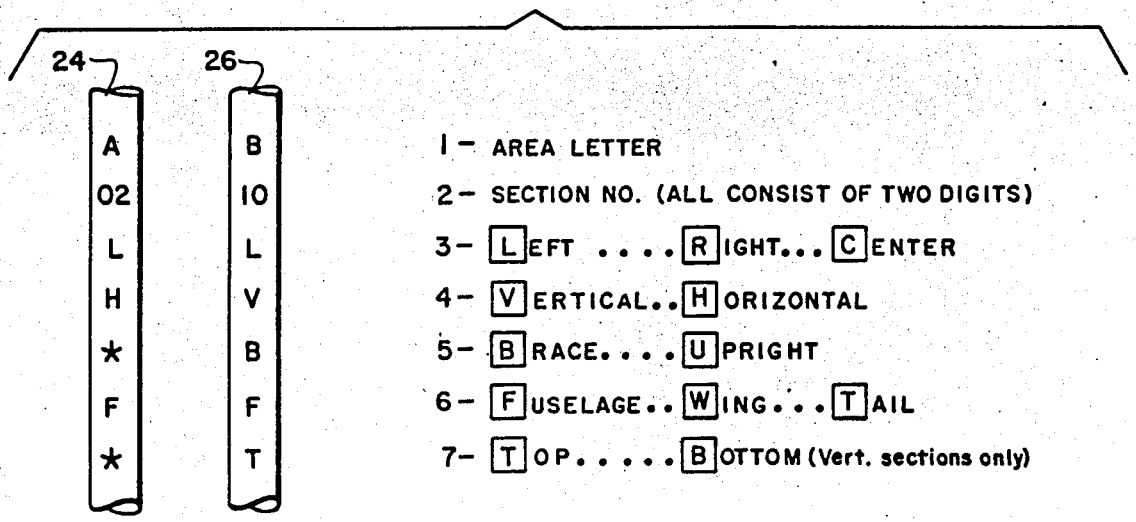
FIG. 4 shows the use of location identification markings on tubing sections to aid assembly.

FIG. 4 shows the use of location identification markings on tubing sections to aid assembly. Horizontal tubing section 24 and vertical tubing section 26 are shown with an index to an eight digit identification code. Areas and sections of the aircraft decoy are indicated on plan views in an assembly instruction manual. Use of the markings greatly facilitates assembly by providing logical and intuitive guidance to the proper assembly location of each tubing section while minimizing the time required for assemblers to continually refer to the manual.

It is understood that certain modifications to the invention as described may be made, as might occur to one with skill in the field of this invention, within the scope of the claims. Therefore, all embodiments contemplated have not been shown in complete detail. Other embodiments may be developed without departing from the spirit of this invention or from the scope of the claims.

We claim:

1. An aircraft decoy, comprising:
(a) a frame simulating in size and shape a full size airplane;
(b) means for covering the frame to produce specific desired optical, infrared and radar characteristics.

2. An aircraft decoy according to claim 1, wherein the frame comprises tubing connected by tubing fittings and assembled into a frame substantially defining the shape of an actual aircraft.

3. An aircraft decoy according to claim 1, wherein the covering means further comprise:
(a) a fabric; and,
(c) a coating on the fabric.

4. An aircraft decoy according to claim 3, wherein the fabric is a woven material with a sufficiently open weave chosen to present as little air resistance as possible while preserving sufficient optical opacity.

5. An aircraft decoy according to claim 3, wherein the coating is a photo resistive dye.

6. An aircraft decoy according to claim 3, wherein the fabric is knitted nylon.

7. An aircraft decoy according to claim 3, wherein the fabric is metallized.

8. An aircraft decoy according to claim 3, wherein the coating is a paint or dye into which has been mixed metal particles.

9. An aircraft decoy frame comprising tubing inserted into tubing fittings to form an assembly substantially defining the shape of an actual aircraft.

10. An aircraft decoy frame according to claim 9, wherein sections of tubing include location identification markings.

11. A method of constructing an aircraft decoy, comprising the steps of assembling tubing with tubing fittings to form a frame substantially defining the shape of an actual aircraft.

12. A method of constructing an aircraft decoy according to claim 11, further comprising the step of marking tubing sections with location identification markings.

* * * * *